United States Patent

[11] 3,593,802

[72] Inventor William De Lange, Jr.
2523 S. Prospect St., Springfield, Mo. 65804
[21] Appl. No. 793,728
[22] Filed Jan. 24, 1969
[45] Patented July 20, 1971

[54] EDGING APPARATUS
8 Claims, 8 Drawing Figs.

[52] U.S. Cl. .................................................. 172/15,
172/17, 172/43, 172/111, 172/429, 172/459
[51] Int. Cl. ................................................ A01b 45/00
[50] Field of Search .......................................... 172/14-
—17, 42, 43, 111, 429, 459

[56] References Cited
UNITED STATES PATENTS

| | | | |
|---|---|---|---|
| 617,379 | 1/1899 | Wilbur | 172/429 X |
| 2,680,945 | 6/1954 | Reed | 172/14 X |
| 2,725,813 | 12/1955 | Stoeber | 172/15 |
| 2,651,249 | 9/1953 | Morkoski | 172/459 X |
| 2,739,437 | 3/1956 | True | 172/15 UX |
| 2,791,875 | 5/1957 | Faas | 172/15 X |
| 2,827,748 | 3/1958 | Simpson | 172/14 X |
| 2,992,689 | 7/1961 | Laughlin | 172/16 |
| 3,117,632 | 1/1964 | Caggiano | 172/111 X |
| 3,346,053 | 10/1967 | Allegretti | 172/16 |

FOREIGN PATENTS

| | | | |
|---|---|---|---|
| 997,180 | 9/1951 | France | 172/43 |
| 384,497 | 12/1932 | Great Britain | 172/16 |

Primary Examiner—Edgar S. Burr
Attorney—Bedell and Burgess

ABSTRACT: An apparatus for edging or troughing a surface, such as the ground along a walkway, the apparatus including a supporting frame resting upon wheels and mounting a motor that interconnects through drive means to operate a cutter blade assembly, the blade of the assembly being disposed for rotation around a substantially vertical axis; the axis of rotation of said blade being changeable through adjustment of a bracket mounting the assembly to the frame, and the depth of penetration of said blade being controlled through regulatory means mounting the rearmost wheel to the supporting frame.

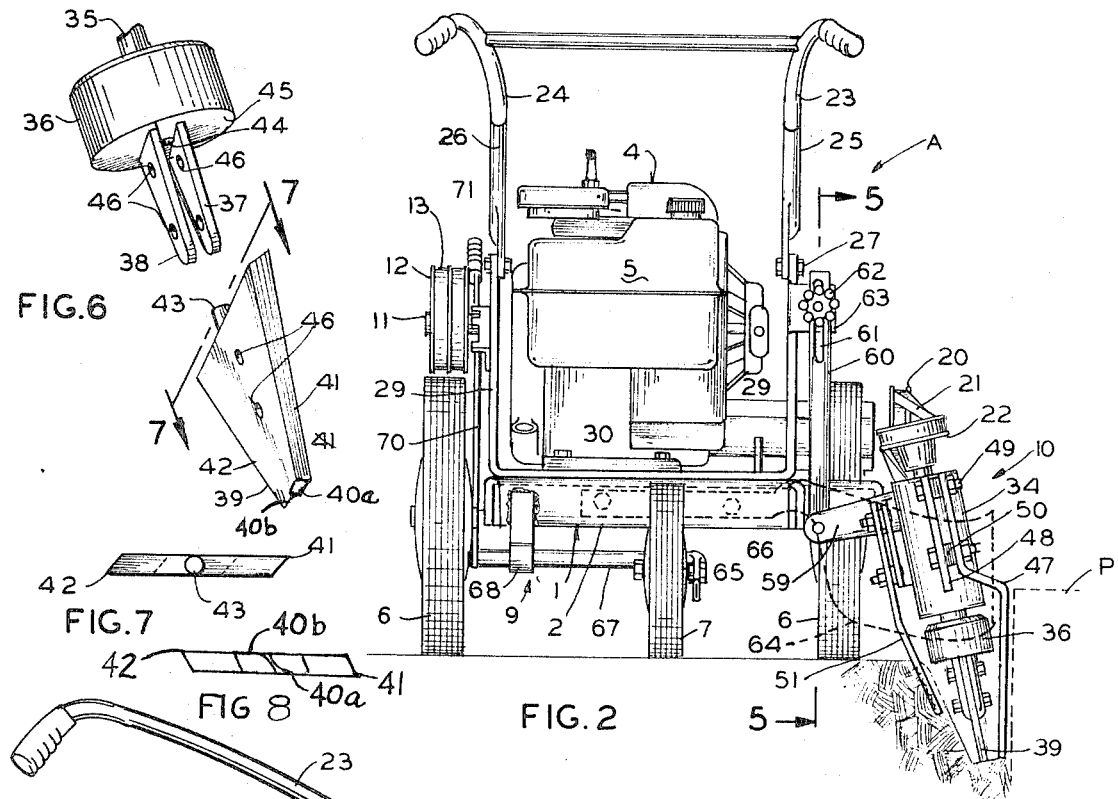

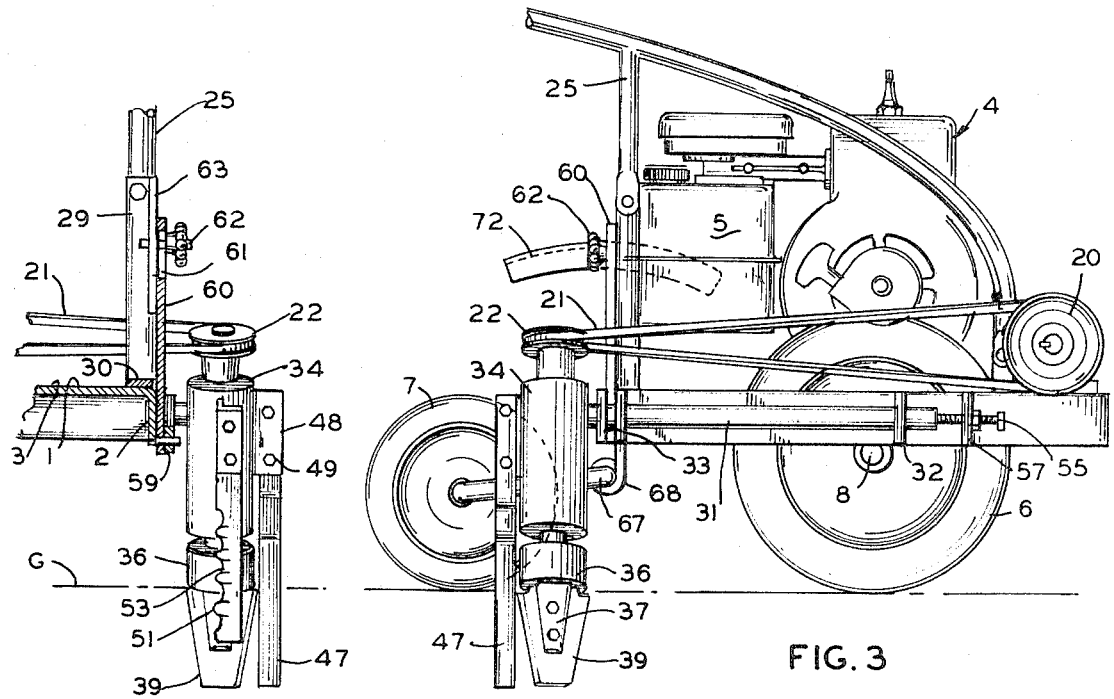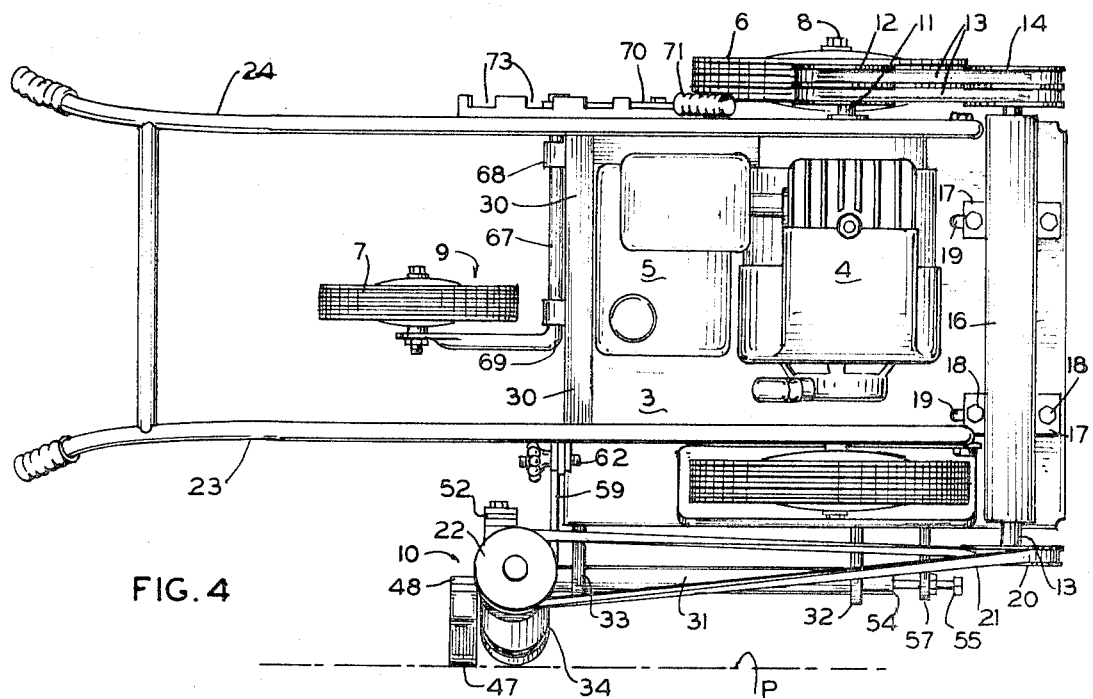

3,593,802

EDGING APPARATUS

BACKGROUND OF THE INVENTION

This invention relates in general to an apparatus useful for edging or troughing the ground especially proximate a hard surface, but in particular, relates to an edging device which incorporates a cutter blade assembly disposing its blade for rotation around a vertical axis, while including means for adjusting the angle of its axis of rotation, in addition to controlling the depth of penetration of the blade into the ground.

Various designs in edging tools particularly useful for trimming grass along a sidewalk or curb have been devised and are revealed in the prior art. Most of these tools are constructed for rather delicate use, primarily being employed only for cutting or trimming any excessive growth of grass or weeds that may occur along a sidewalk, as previously mentioned. It is not apparent that any of the previous edgers were constructed for use in actually troughing the ground adjacent to a walkway, so that not only would the grass be clipped adjacent this area, but simultaneously a portion of the earth would also be removed thereby preventing for some time any additional growth of grass along this area.

Since the only use of the edgers heretofore disclosed was to perform a trimming function, most of these devices simply reveal rather delicate blades which are useful to achieve a mild cut of overlying grass. One such example shows a pair of blades which coact in a scissorlike manner to simply cut the excess grass that may be overlying the edge of the sidewalk, whereas other embodiments reveal a series of blades that revolve around a horizontal axis for the purpose of trimming the grass or perhaps to loosen its supporting sod. In the previous embodiments incorporating simply a pair of blades, such an arrangement can never be employed as a heavy duty troughing instrument for cutting or shaping the earth, since such a use of sharpened blades would either quickly dull them, or cause their breakage. Horizontally rotated blades additionally cannot be efficiently used for trenching the ground since such blades thusly disposed would quickly bind upon the surface either causing their breakage, or forcing the blades to rise out of the ground and rendering the cutter unmanageable. In addition, it is believed that the blades of an edger constructed in the previous manner are not adequate to perform a troughing function in the surface of the ground, especially ground that may have become dried and hardened, or in which rocks, tree roots, or other course objects may pervade. Furthermore, such cutters ordinarily do not function efficiently in cutting rank weeds.

To overcome the foregoing problems, it is believed that an edger incorporating a blade which rotates about a vertical, or near vertical, axis is much more efficient in use, and will more readily withstand the rough treatment as when encountering rocky soil, and may receive further widespread usage as a troughing or minor trenching instrument for use in the construction or related fields.

It is therefore an object of this invention to provide an edging apparatus incorporating a blade rotating about a near vertical axis and useful for troughing or edging ground at a variety of locations.

It is another object of this invention to provide an apparatus for edging a surface in which its cutter blade assembly may be adjusted providing for minor adjustment of the vertical axis of rotation of its integral blade so that the blade may pivot about either a vertical, or near vertical, axis to accommodate to variations in transverse slope of the ground surface on which the machine is operated, as well as to operation on level ground.

It is a further object of this invention to provide an apparatus for edging the ground and which incorporates regulatory means which may be adjusted to provide for control of the depth of penetration of the blade into the ground so that the desired size of furrow may be acquired.

It is still another object of this invention to provide a lawn edging apparatus including guide or handle means readily accessible and which are sturdily mounted to the supporting frame of the apparatus thereby allowing for facile use, control and maneuverability of the same by an operator.

It is still a further object of this invention to provide an edging apparatus incorporating a generally vertical disposed cutter blade assembly receiving its motive power from a mounted motor interconnecting to said assembly through the agency of drive means which also may be readily adjusted to provide for its efficient operation.

It is an additional object of this invention to provide an edging apparatus which is sturdy in construction, easy to assemble, and facile of handling during operation.

These and other objects of this invention will become more apparent to those skilled in the art in light of the following description and accompanying drawings

SUMMARY OF THE INVENTION

An analysis of this invention discloses an edging apparatus incorporating a supporting frame, useful for mounting a heavy duty motor which functions to provide motive power to the cutter blade assembly used in troughing or trenching the ground. The supporting frame is rendered maneuverable by having mounted thereto a series of wheels, and is easily guided, when manually operated, through the use of handle gripping means that project rearwardly from their connection rigidly to the supporting frame.

The cutter blade assembly is essentially pivotally mounted to the supporting frame of the apparatus, but may be rigidly affixed thereto so that once adjusted it will operate efficiently to perform the functions previously described without any interference. The blade of this assembly is generally upright oriented so that it may rotate generally around a vertical axis, and through this arrangement be capable of producing a troughlike cut in the surface of the ground at varying depths without obstruction, regardless whether the ground be soft, or constituting hard rock laden soil. The cutter assembly mounts to the supporting frame of the apparatus by means of a bracket, and the bracket includes a rod having a bearing sleeve through which the cutter assembly and blade rotate, with the rod and sleeve, for adjustment purposes, being pivotally mounted to the frame. A lever projecting from the rod pivotally connects with an adjustable member that may be tightened to said frame, but that upon its loosening, may provide for a shifting and disposition of the cutter blade assembly to the vertical, or near vertical, angle with respect to the ground. Once the assembly has been set to the desired angle, the adjustable member may be locked in place against the frame, thereby securing the cutter assembly sturdily for the cutting operation.

The blade of the cutter assembly is protected by means of a guard member that prevents it from coming into contact with any hardened surface such as a concrete walks, while upon the other side of said blade is located a cutter bar which in conjunction with the operation or rotation of the blade functions to sever any grass or weeds approximate this area. Since the cutter blade assembly is performing at high speeds during its troughing action, there is the possibility that rocks or other debris may be cast into the air during operation, therefore a shield mounts to the supporting frame and is arranged rearwardly of the cutting blade assembly to guard against this ejecting of any projectiles towards the operator of the apparatus.

It is an additional aspect of this invention to provide for a setting of the apparatus so that the required depth of cut into the soil may be achieved. To effect this, the rearmost wheel supporting the frame connects through height regulating structure to the supporting frame, and this wheel may be raised or lowered with respect to said frame, thereby simultaneously allowing for, respectively, a lowering or raising of the associated cutter blade assembly. This means for regulating the positioning of the wheel is achieved through the use of a shaft which pivotally mounts to the frame, and at one turned end has the wheel rotatably connected thereto, while the other end attaches with a bar which is operatively associated with a catch, integral with the frame, and which holds the bar at various angles thereby providing for a raising or lowering of the wheel within a select range. As previously remarked, since the height of a wheel with respect to the frame is changeable, likewise the depth of penetration of the cutter blade assembly into the soil may be regulated.

The precise relationship between the bracket means supporting the cutter blade assembly, and the regulatory means adjusting the height of the apparatus in conjunction with the depth of the blade, will become more cognizable through a detailed structural analysis of the preferred embodiment of this invention.

BRIEF DESCRIPTION OF THE DRAWINGS

In the drawing,

FIG. 1 is a right side view of the edging apparatus showing its rearmost wheel fully lowered, thereby completely withdrawing the cutter blade assembly from the soil;

FIG. 2 is a rear view of the edging apparatus showing the rearmost wheel fully raised, thereby penetrating the blade of the cutter blade assembly deeply into the soil;

FIG. 3 is a right side view of the edging apparatus disclosed in FIG. 2;

FIG 4 is a top view of the edging apparatus disclosed in FIG. 2;

FIG. 5 is a lateral sectional view of part of the bracket means supporting the cutter blade assembly to the frame;

FIG. 6 is an exploded perspective partial view of the cutter blade assembly;

FIG. 7 is a top view of the cutter blade taken along the line 7-7 of FIG. 6.

FIG. 8 is a bottom view of the cutter blade.

DESCRIPTION OF THE PREFERRED EMBODIMENT

Referring now to the drawings for an illustrative embodiment of the edging apparatus of this invention, the apparatus is shown in its entirety in various views in the FIGS. 1 through 4, the embodiment depicted in FIG. 1 differing only from the same shown in the other FIGS. in having its cutter blade assembly being elevated above the surface of the ground. The invention, as shown in the various aforesaid views, comprises the apparatus A, basically constructed having a supporting frame 1 which may be constructed having reinforced edge structures 2, and a cover plate 3 on which the prime mover, such as motor 4 and its associated fuel tank 5, is rigidly supported. The supporting frame and its mounted motor and fuel tank are supported above the surface of the ground G by means of a plurality of wheels 6 and 7, the forward wheels 6 being rotatably mounted by means of stub-axles 8 directly secured to the side structures 2 of the supporting frame, whereas the rearmost wheel 7 is rotatably mounted on a regulatory means 9 which may be adjusted to provide for a raising or lowering of said wheel, thereby providing for an adjusting of the depth to which the cutter blade assembly 10 may penetrate into the ground.

Referring to motor 4, it will be noted that its transversely extending drive shaft 11 has attached to its projecting end a pulley 12, over which a pair of belts 13 are turned for providing a rotation of the additional pulley 14 which is mounted on the end of a transverse idler shaft 13, which is journaled for rotation through a substantially elongated bearing 16. This bearing is secured to the supporting frame 1 by means of bolts 18 passing through the integral flanges 17 of the bearing and the cover plate 3 of said frame. It is to be noted that bolts 18 are inserted through elongated slots 19 so that bearing 16 may be adjusted by sliding it forwardly or rearwardly upon the supporting frame so as to properly accommodate the size of belts used in conjunction with the pulleys. The other end of the shaft 15 extends out of the bearing at the opposite side of the frame and has secured thereto another pulley 20. This pulley is associated in the drive means of the apparatus so as to provide for the rapid rotation of the cutter blade assembly 10, which is accomplished through the engagement of belt 21 around pulley 22 of said cutter blade assembly so that upon operation of motor 4, the interconnection between the various pulleys and associated belts will effect a rotation of the pulley 22, which drives cutter blade assembly 10. Although not shown, any common clutch mechanism may be incorporated within this drive assembly so as to allow for temporary cessation in the rotation of the cutter blade assembly while motor 4 sustains operation.

The maneuverability of this apparatus is provided through the arrangement of any guide means such as the pair of connecting handle bars 23 and 24 which are secured at their front ends to the supporting frame 1, and which integrally connect at their midpoints to drop-bars 25 and 26, said drop-bars being connected by means of bolts 27 to the upright projections 28 and 29 of a brace 30 rigidly secured to the supporting frame 1. It should be noted that the handle bars may be disconnected from the supporting frame and upright projections so that the entire apparatus may be reduced in size to facilitate handling and transfer when necessary.

The cutter blade assembly 10, as shown, comprises a rod 31 which is pivotally mounted through a pair of ears 32 and 33 that project from the side structure 2 of the supporting frame. The rear end of said rod is integrally connected to a bearing sleeve 34, and said sleeve and its rod 31 together pivot as when it is desired to change the angle at which the cutter blade assembly extends toward the ground G. Journaled through sleeve 34 is a shaft 35 which has the aforesaid pulley 22 secured thereto at its upper end, while a rotor 36 rigidly connects to the lower end of said shaft. Ears 37 and 38 extend downwardly from said rotor to form a clevis for securing to the rotor the cutter blade 39 which is used in cutting the soil and troughing it, as during operation of the apparatus. (See also FIG. 6.) By referring additionally to FIG. 7, it can be seen that the cutter blade 39 is generally of an inverted trapezoidal shape, being of reducing dimension from its upper end to its lower edge. The sides of the blade are slightly beveled to provide a pair of sharpened cutting edges 41 and 42 on opposite leading surfaces of the blade, and the bottom of the blade is similarly beveled in opposite directions on opposite sides of its center to provide a pair of cutting edges 40a and 40b with the edges providing the means for incising the ground during the cutting process. The blade may be formed from any hard metal such as tool steel strong enough to withstand the rough treatment that may be encountered during usage, and the cutting edges 41 and 42 may be surfaced with wear resistant material. To further furnish rigidity in the connection of the blade to its rotor 36, a small upward projection 43 is disposed for insertion within a slot 44 provided into the downward facing 45 of the rotor, so that this projection may be inserted within said slot intermediate the clevis ears 37 and 38 prior to the bolting of said cutter blade in place as by the insertion of bolts through the plurality of aligned apertures 46.

During operation of the cutter blade assembly 10, as during usage of the apparatus, its blade 39 is lowered into the soil of the ground G at the location to be trenched. To extend the life of cutting blade 39 and particularly its sharpened edges, a guard member 47 is connected to flange 48 of the bearing sleeve 34, and held in place as by means of a pair of bolts 49. It can be seen that this guard 47 is bent at particular points so that when secured to the aforesaid sleeve, it extends laterally of the blade, and just slightly rearwardly thereof, maintaining a position approximately in alignment with the angle of the contiguous cutting edge of the blade. Through this arrangement, when the apparatus is used to provide a trough in the ground at a location close to a paved walkway or curb C, this guard 47 will frequently come into contact with the side of the curb, thereby preventing the cutting edge of the blade from doing likewise and maintaining the blade in uniformly spaced relation with the pavement, while at the same time the guard, with its front edge perhaps sharpened, will scrape any residual earth from the pavement to complete the troughing operation. It is to be noted that shims 50 are disposed intermediate the guard 47 and flange 48, so that the guard may maintain its proper relationship with respect to the cutter blade being used, and in the event a larger or smaller cutter blade is employed, variations in the size of these shims may be made so as to increase or decrease the disposition of the guard with respect to this change in the side of blade being used. Also connected to bearing sleeve 34 at a location approximately on the opposite side to the disposition of guard 47 is a cutter bar 51. Shims 52 may be positioned between the cutter bar and bearing sleeve 34 to provide for proper spacing of the bar in substantially flush relation with the edge of the blade when the latter rotates by the bar. By referring to FIG. 5 it can be seen that cutter bar 51 has serrations 53 along its forward edge so that as the apparatus is being used, this serrated edge of the bar cooperates with the revolving cutter blade to induce sheering of any grass or weeds that may be located proximate this area of the trough or ground.

It is conceivable that during operation of the apparatus, belt 21 associated with the drive mechanism may possibly become stretched after prolonged usage, and therefore takeup means to compensate for this stretch is provided. To achieve such, forward end 54 of rod 31 has biased thereagainst a bolt 55 which threadedly engages a nut 56 secured to a flange 57 permanently affixed to the edge structure 2 of the supporting frame. Therefore, by turning bolt 55 in either direction the contiguous end of rod 31 may be shifted in either direction so as to take up any slack in the belt or loosen the same in the event it is too tight.

Referring to FIG. 2, it is apparent that adjustment must be made of cutter blade assembly 10 at various angular positions with respect to the vertical to allow the blade to operate as close as possible to the pavement P so that proper troughing may be performed. To achieve this adjustment bracket means 58 interconnecting and operating with some of the elements described in cutter blade assembly 10 attaches to supporting frame 1 of the apparatus, and through its regulation may provide for adjustment in the angular disposition of said assembly, particularly its blade. This bracket means includes a transverse lever 59 projecting integrally from rod 31 and in a direction toward the apparatus. Said lever at its other end is pivotally connected to an adjustment member 60 which, at its upward end, is provided with elongated slot 61 through which bolt and cooperating nut combination 62 passes to retain said member stationary with respect to a flange 63 formed on upright projection 28 of brace 30. Since rod 31 is pivotally mounted through ears 32 and 33, by loosening of nut 62, adjustment members 60 can be raised or lowered with respect to said flange 63, thereby urging lever 59 to pivot the cutter blade assembly a few degrees with respect to the vertical. In this manner, the entire cutter blade assembly and more particularly its blade 39 and guard 47 may be turned slightly through adjustment of member 60 until the guard comes into flush contact with the side of pavement P, at which time hand nut 62 may be once again tightened, fixing the entire cutter blade assembly in place. This bracket means allows for simple, quick and easy adjustment of the cutter blade assembly, which may be readily performed by an operator at any given moment during usage of the apparatus.

Since any type of edging apparatus, and in particular grass or ground cutting devices, possess some inherent dangers through exposure of their cutting blade assembly to the operator, it has been found useful to incorporate a shield 64 in this apparatus; the shield is arranged rearwardly surrounding the exposed rear of the cutter blade assembly, and is rigidly secured to the frame by attachment of its integral arm 65 by means of bolts 66 to the supporting frame 1.

To further enchance fexibility of use of this apparatus in edging or troughing a surface, means are provided for regulating the depth to which the cutter blade assembly and more particularly blade 39 penetrates into the ground. To do this and to perform this process rapidly rear wheel 7 is rotatably mounted on a regulatory means 67 which provides for rapid raising or lowering of the rear wheel with respect to its supporting frame. Naturally, if the frame is elevated with respect to the rear wheel the cutter blade assembly will more deeply penetrate into the ground. Contrariwise, should the frame be lowered or extended with respect to the rear wheel in a manner that the supporting frame will be displaced higher from the ground, then cutter blade assembly 10 will likewise be raised higher with respect to ground G until such time as it may become totally withdrawn from its surface (FIG. 1). This regulatory means comprises a transverse shaft 67 pivotally secured to braces 68 that connect to side structure 2 of the supporting frame. One end segment of shaft 67 is bent perpendicularly as at 69 and rearmost wheel 7 is rotatably mounted thereto. The other end of shaft 67 is bent and connected with a bar 70 which extends upwardly into alignment, or close proximity, with upright projection 29 of brace 30. The upper end of bar 70 is provided with a hand grip 71, which facilitates grasping by the hand of the operator. Secured to the outward side of upright projection 29 is an arcuate bar 72 which is provided with a series of equally spaced slots 73 which are disposed for holding therein the resilient bar 70, as when it is desired to fix said bar and its connecting shaft 67, in addition to wheel 7, at any particular position. When it becomes necessary to lower wheel 7 in a manner which effects elevation of supporting frame 1, handle 71 of bar 70 may be grasped and flexed outwardly of slots 73, and the entire bar pulled rearwardly so as to cause shaft 67 and its rotatably mounted wheel 7 to pivot downwardly thereby causing a raising of the support frame 1. When this occurs bar 70 may be released for catching in rear slot 74 of catch 72. When this process has been performed the entire cutter blade assembly will be raised above the ground (FIG. 1). Likewise, when it is desired to lower cutter blade assembly 10 deeply into the ground (FIG. 2) bar 70 again may be urged flexibly outwardly from its connection in a slot and then shifted forwardly, thereby effecting a pivot of shaft 67 and its wheel 7 in an upward manner which causes a lowering of supporting frame 1. When bar 70 has been pivoted to its forward most limit, it may be released and held stationary within slot 75 of the catch (FIG. 4). When arranged in this manner, wheel 7 will be raised upwardly with respect to the supporting frame, thereby causing cutter blade assembly 10 and more particularly its blade 39 to be lowered into ground G. When arranged in this manner, the apparatus is maintained level and ready for use in troughing or creating a trench in the ground.

Numerous variations in the construction of the edging apparatus of this invention, within the scope of the appended claims, will probably occur to those skilled in the art in light of the foregoing disclosure. These variations are intended to be included within the breadth of the claims describing the principle of operation of this invention. The disclosed embodiment, and its detailed description, is merely illustrative.

I claim:

1. Edging apparatus including ground engaging forward and rear wheels, a frame supported on said wheels and mounting a motor, guide means connected to the wheel-supported frame providing for control of the direction of movement of the apparatus during usage, a cutter blade assembly depending from said frame and having a mainly vertical blade rotatable about an approximately vertical axis, a guard member disposed laterally of the cutter blade and engageable with pavements and the like to maintain said blade in uniformly spaced relation with such pavements, said cutter blade assembly being operatively connected with said motor for inducing rotation of said blade, said cutter blade having a pair of oppositely disposed cutting edges from proximate its uppermost to lower extents, said blade being generally of reducing dimensions from its upper to its lower end and being generally of an inverted trapezoidal shape, said cutter blade assembly including bearing means and a rotor journaled therein and supporting said blade, said guard member being substantially aligned longitudinally of the apparatus with the transversely outermost position of the blade edges, but offset longitudinally rearwardly from the blade axis whereby to shelter said blade from obstruction during its rotation and operation, and a cutter bar secured to said blade assembly and disposed approximately laterally of said rotating cutter blade on the side thereof opposite said guard member, said cutter bar being in close proximity with the innermost transverse position of said blade hereby to cooperate with said blade as a cutter.

2. Edging apparatus including ground engaging forward and rear wheels, a frame supported on said wheels and mounting a motor, guide means connected to the wheel-supported frame providing for control of the direction of movement of the apparatus during usage, a cutter blade assembly depending from said frame and having a mainly vertical blade rotatable about an approximately vertical axis, a guard member disposed laterally of the cutter blade and engageable with pavements and the like to maintain said blade in uniformly spaced relation with such pavements, said cutter blade assembly being operatively connected with said motor for inducing rotation of said blade, said blade being laterally offset from all of said wheels and rearward of said first wheels, and regulatory means interconnecting said frame and a rear wheel and being adjustable to raise and lower said frame on said rear wheel and concurrently raise and lower said cutter blade assembly.

3. The invention of claim 2 wherein said cutter blade has a pair of oppositely disposed cutting edges from proximate its uppermost to lower extents, said blade being generally of reducing dimensions from its upper to its lower end and being generally of an inverted trapezoidal shape, said cutter blade assembly including bearing means and a rotor journaled therein and supporting said blade.

4. The invention of claim 2 wherein said regulatory means comprises a transverse shaft pivotally mounted on said frame proximate the adjacent rearward portion thereof, one end segment of said shaft means being bent to provide for the rotatable mounting at its end of said rear wheel, a bar rigidly secured to the other end of said shaft and extending radially therefrom and being arranged in proximity with the frame, catch means attached to said frame and disposed for locking said bar stationary whereby to hold said rear wheel in fixed vertical relationship with the frame, said bar being capable of being locked at various locations along said catch means to allow said rear wheel to be disposed at varying vertical distances from said frame thereby providing simultaneously for variations in the vertical disposition of the blade with respect to the surface to be edged.

5. The invention of claim 2 including a shield mounted on said frame and projecting rearwardly of the cutter blade assembly and extending transversely of the portion of said cutter assembly normally projecting above the ground, whereby to prevent debris from the trough being thrown by said blade against the operator during operation of the apparatus.

6. The invention of claim 2 including adjustable bracket means interconnecting said frame and said cutter blade assembly which upon adjustment provides for a setting of the blade at an inclination transversely of the apparatus with respect to the vertical.

7. The invention of claim 6 wherein said bracket means comprises a rod pivotally mounted on the frame, a bearing sleeve rigid with one end of said rod, a rotor included in said cutter blade assembly for retention of its blade, said rotor being rotatably mounted within said bearing sleeve, a radial lever on said rod, an adjustable member pivotally connected to the end of said lever remote from said rod, said member being adjustably attached to said frame for selective movement with respect thereto whereby to provide for variation in the angular arrangement of the cutter blade and assembly with respect to the surface to be cut.

8. The invention of claim 7 including drive means operatively connecting said motor and said rotor and takeup means coacting with the other end of said rod thereby providing for adjustment of said drive means.